Aug. 5, 1958  J. E. DRAKE  2,846,242
PACKED ANTI-FRICTION BALL AND SOCKET COUPLING
Filed Nov. 2, 1955  2 Sheets-Sheet 1
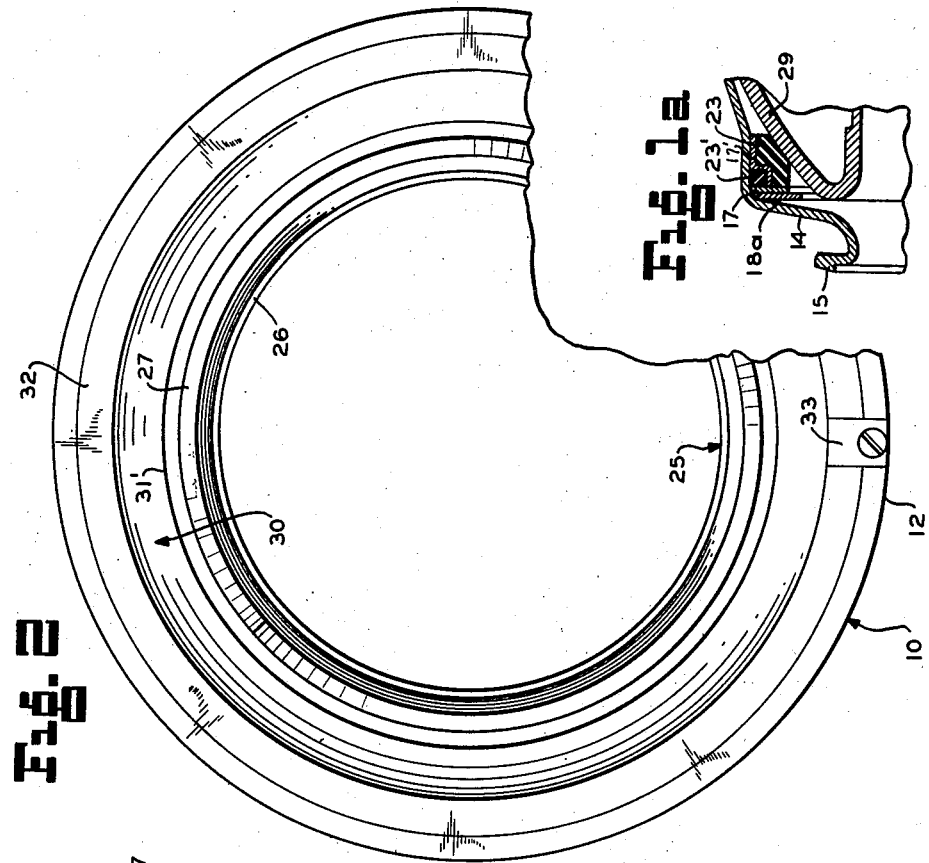
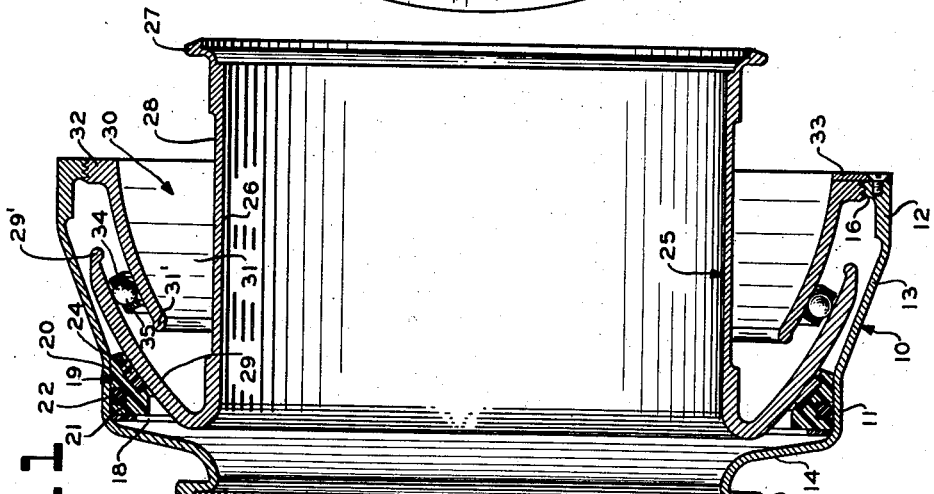
INVENTOR.
JOHN E. DRAKE
BY Joseph F. Padlon
ATTORNEY Aug. 5, 1958   J. E. DRAKE   2,846,242
PACKED ANTI-FRICTION BALL AND SOCKET COUPLING
Filed Nov. 2, 1955   2 Sheets-Sheet 2
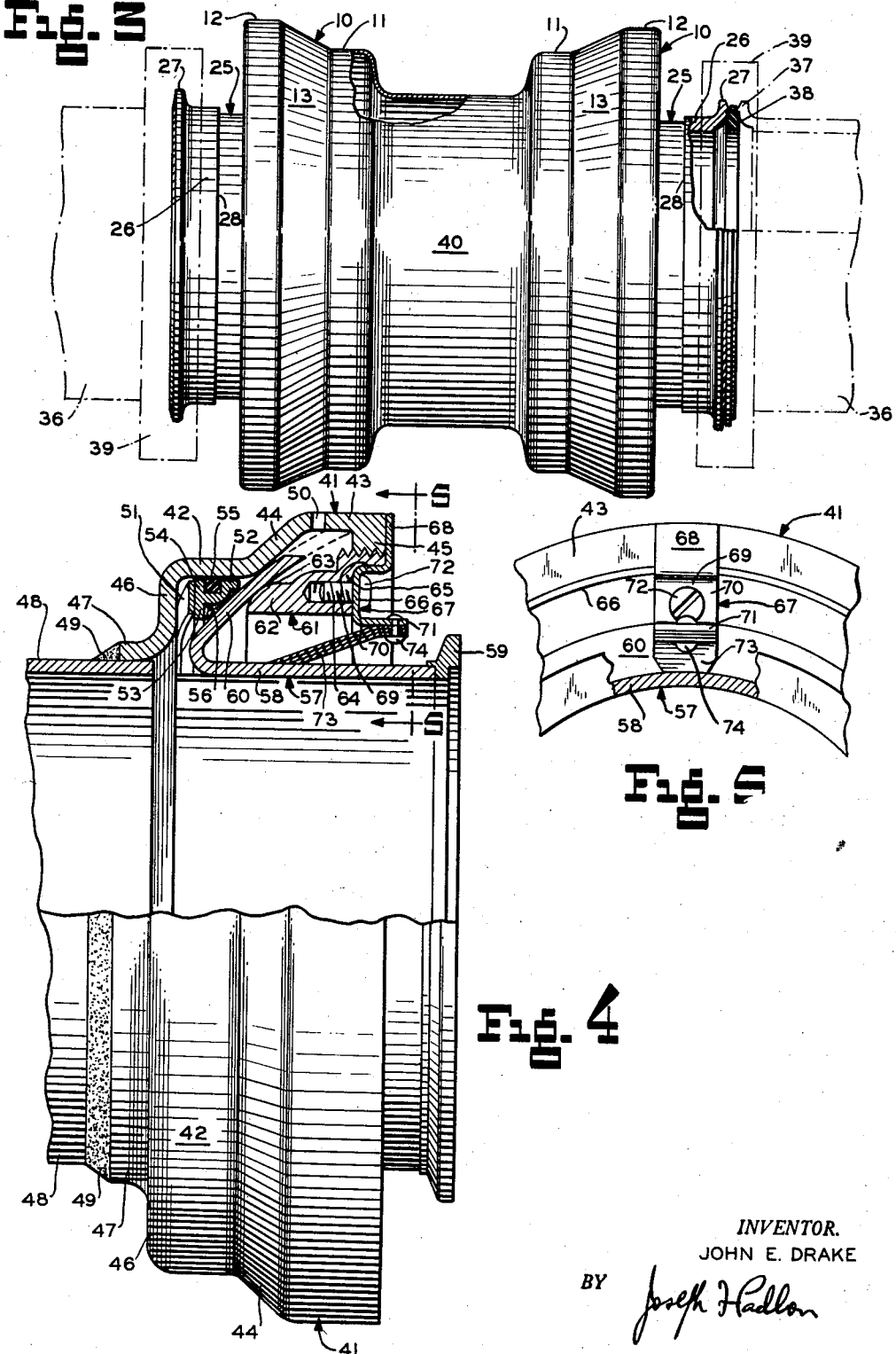
INVENTOR.
JOHN E. DRAKE
BY Joseph Hadlon
ATTORNEY

United States Patent Office 2,846,242
Patented Aug. 5, 1958

2,846,242

PACKED ANTI-FRICTION BALL AND SOCKET COUPLING

John E. Drake, Northport, N. Y.

Application November 2, 1955, Serial No. 544,545

3 Claims. (Cl. 285—263)

This invention relates to an angular coupling, and more particularly to angular couplings intended for use with air ducts of airplanes and the like type of units.

It is an object of the present invention to provide an angular coupling that will permit limited angular movement between the connected members forming with the coupling a complementary unit.

It is another object of the present invention to provide an angular coupling for air ducts or the like which will permit complete rotational movement between the connected members.

It is still another object of the present invention to provide an angular coupling for air ducts or the like which embodies the use of a conical sealing surface in contact with a spherical surface, with attendant advantages.

It is still another object of the present invention to provide angular couplings for air ducts or the like wherein a spherical surface is provided on an extension of the coupled duct and whereby if two such ducts are employed, the spherical surfaces will face each other.

It is still another object of the present invention to provide an angular coupling for air ducts which is adapted to permit angular movement between the coupled members of approximately ten degrees in each direction and 360 degrees rotation of the coupled ducts relative to each other at elevated temperatures and pressures.

It is still another object of the present invention to provide an angular coupling for air ducts permitting angular and rotational movement between the coupled members wherein the force required to flex or rotate the coupling is minimized.

It is still another object of the present invention to provide an angular coupling for air ducts permitting angular and rotational movement between the coupled members wherein the starting or initial force in flexing or rotating the coupling is minimized.

It is still another object of the present invention to provide an angular coupling for air ducts or the like wherein the weight of the coupling members is substantially reduced and wherein leakage is reduced to a minimum.

In conventional ball joints used as connections the spherical surfaces are part of the joint and are located between the ends of the ducts. To provide the required diameter opening and large bending, it is necessary to employ a large sphere, and the structure becomes excessively heavy. Also, angularity, passage obstruction and clamping methods present serious problems.

It is accordingly another object of the present invention to provide an angular coupling which eliminates the above disadvantages by providing spherical surfaces on the ends of the ducts, removing thereby the limitations on the diameter of the sphere and providing a simple method for holding the ducts together.

Other objects of the present invention are to provide an angular coupling bearing the above objects in mind which is of simple construction, inexpensive to manufacture, has a minimum number of parts, is easy to install and efficient in operation.

For other objects and a better understanding of the invention, reference may be had to the following detailed description taken in connection with the accompanying drawing in which:

Fig. 1 is a vertical sectional view of a preferred embodiment of the present invention;

Fig. 1a is a sectional view of an alternate seal that may be used with the coupling of Fig. 1;

Fig. 2 is an end elevational view thereof;

Fig. 3 is a front elevational view showing the invention in operative use for coupling a pair of air ducts;

Fig. 4 is a side view shown partly in elevation and partly in section of a modified form of the present invention; and Fig. 5 is an end view shown partly in section and partly in elevation and taken along the line 5—5 of Fig. 4.

Referring now more in detail to the drawing, and more particularly to Figs. 1 through 3, 10 indicates generally a housing assembly including a thickened cylindrical portion 11 connected to a larger, thickened cylindrical portion 12 by the frusto-conical surface 13, substantially as illustrated.

The cylinder portion 11 is integrally formed with the inwardly extending frusto-conical portion 14 with gradually reduced thickness which is in turn integrally formed with a flange 15, while the cylindrical portion 12 is integrally formed with the inwardly extending flange 16 having a screw threaded inner edge for a purpose which will hereinafter become clear. Though the flanges 15 and 16 are herein shown integral with the remaining part of the housing assembly, they may be made separately and welded thereto.

A wave washer 18 is positioned within the frusto-conical portion 14 and is in resilient contact with a seal assembly indicated generally at 19 including a retainer 20 of substantially triangular cross section (Fig. 1). The outer face of the ring 20 is provided with an annular groove 21 within which is positioned a Silastic O-ring 22.

A frusto-conical Teflon (polytetrafluoroethylene) seal is mounted on the inner face of the retainer 20, the inner face of the seal 24 extending inwardly beyond the inner face of the retainer 20 for a purpose which will hereinafter become clear.

A duct assembly indicated generally at 25 is provided and includes a hollow cylindrical body portion 26 integrally formed at its outer end with a flange 27, the outer surface of the cylindrical body portion 26 being provided with the annular groove 28.

The inner end of the body portion 26 is integrally formed with the folded back, substantially frusto-spherical surface 29 which is adapted to enter into sealing contact with the frusto-conical Teflon seal 24. An alternative arrangement of manufacturing the duct assembly 25 would be to make the flange 27 and spherical surface 29 separately and weld them in place to the cylindrical body portion 26.

A retainer or support generally indicated at 30 includes a frusto-conical body portion 31 and an outwardly extending flange 32 threaded at its outer edge. The threaded flange 32 is adapted to be screwed into engagement with flange 16 of the housing assembly 10. Relative rotational movement between the housing assembly and support 30 is prevented by means of a lock 33 and lock screw as seen in Figs. 1 and 2.

A circular retainer 34 having a series of ball bearings 35 therein fits between the frusto-spherical surface 29 and the frusto-conical body 31. The inner diameter of the circular series of ball bearings will determine its location between end 29 and body 31. This diameter is chosen so that the ball bearings are in the position shown in Fig. 1. It is apparent that this construction urges end 29 in sealing contact with seal 24.

The ball bearing arrangement minimizes the force required to flex or rotate the coupling by providing easy rolling friction. Also, the starting force when the coupling is first required to flex is minimized. This is particularly desirable in ducts used in aircraft in that it permits lighter design of the structures that are used to support the ducts.

By means of this construction, the longitudinal axis of the duct assembly 25 (shown parallel to the longitudinal axis of the housing assembly 10 in Fig. 1) may be moved angularly relative to the longitudinal axis of the housing assembly in opposite directions approximately ten degrees, this moving being limited in opposite directions by the stop projections 29' and 31' which will contact the raceway 34 to determine the extremes of angular deflection. Furthermore, by means of this construction, said duct assembly 25 may be rotated within the housing assembly through 360 degrees in opposite directions.

In Fig. 1a, there is shown an alternate design of the seal assembly 19. In this construction, a back up ring 17 is positioned adjacent the wave washer 18A. A carbon ring 23 is positioned inside of the ring 17 and has a retaining ring 17' along the upper surface thereof. Ring 17 has a grooved corner to receive an O-ring seal 23' to provide sealing contact between the sealing assembly and the housing assembly. This alternative carbon seal is especially adaptable to high temperature use.

Fig. 3 shows a construction for joining two aligned air ducts 36. In this arrangement, a single housing assembly 40 is provided that holds two ducts assemblies 26 which face each other and are of the same construction as the duct assembly shown in cross-section in Fig. 1. The flanges 27 are connected to the flanges 37 integrally formed in the ends of the air ducts 36 by means of seals 38 and conventional clamps 39. Thus, by means of the invention, the air ducts 36 are coupled, while at the same time permitting angular displacement therebetween of approximately 10 degrees in opposite directions and rotational movement therebetween of 360 degrees in opposite directions.

The invention is particularly adapted for coupling air ducts 36 commonly employed in aircraft for air at 550 degrees F. temperature and 100 pounds per square inch pressure, the ducts having a diameter of 5 inches, although it will be apparent to those skilled in the art that the application of the invention is not limited thereto.

The coupling is designed to function under proof pressure of 150 pounds per square inch and a burst pressure of 250 pounds per square inch with an ambient temperature of —65 degrees F. to 160 degrees F. with a maximum duct air temperature of 550 degrees F. The construction permits a reduced weight and a coupling of five pounds and a permissible leakage of 0.15 pound/minute air, the coupling being formed of stainless steel.

The conical Teflon seal 24 contained in the aluminum retaining ring 20 is held against the spherical sealing surface 29 by the differential force existing between the area of the back of the ring 20 and the smaller area of the seal 24 that is not exposed to pressure. Consequently, sealing force is proportional to pressure and sealing is effective at high pressure. The seal is spring-loaded against the spherical surface by means of the spring 18 to assist assembly and to improve low pressure operation.

The seal 24 is preferably formed of Teflon due to the tough mechanical properties and low coefficient of friction of the latter, a conical surface being employed as it eliminates the close dimensional control necessary to match mating spherical surfaces.

The spherical surface 29 is pressure loaded by its area and by duct pressure reactions against the ball bearings 35. All the contact surfaces are finished, machined and coated with Teflon to reduce friction and improve service life. Sufficient surface contact is provided to prevent overloading the Teflon and to significantly reduce stress concentration in the spherical surface.

The housing 10, it will be noted, consists of conical portions joined by cylindrical portions and is sufficiently strong to withstand the 250 pounds per square inch burst test at 350 degrees F. when stainless steel is used. Additionally, such a configuration provides numerous ways to increase strength, if necessary, by the strategic addition of triangular braces at several locations on the frusto-conical portions.

The thickened portion 32 of the retainer 30 is the strongest single part of the coupling and is sufficiently strong to support the burst test pressure load.

Referring now particularly to Figs. 4 and 5, there is shown a modified form of the present invention including a housing assembly indicated generally at 41. The housing assembly 41 includes the hollow cylindrical portion 42 connected to the enlarged hollow cylindrical portion 43 by means of the frusto-conical portion 44, the end of the cylindrical portion 43 being integrally formed with the inwardly extending, internally threaded collar 45. The free end of the cylindrical portion 42 is integrally formed with the inwardly extending shoulder 46 which terminates in the cylindrical flange 47 adapted to receive therewithin the end of the air duct 48, the flange 47 being secured to the end of the air duct 48 by welding 49. The cylindrical portion 43 is provided with a series of drain openings (6) 50.

A wave washer 51 is positioned within the housing 41 against the shoulder 46, the washer 51 being in resilient contact with a seal assembly indicated generally at 52 positioned within the cylindrical portion 42 of the housing. The seal assembly 52 includes a retaining ring 53 having an outside annular groove 54 within which is positioned a silastic O-ring seal 55 thereby to provide sealing contact between the seal assembly 52 and the housing assembly. A Teflon seal 56 is positioned on the inside of the ring 53, presenting a frusto-conical sealing surface in the same manner as the seal 24 of the first form.

A duct assembly indicated generally at 57 is provided and includes a hollow cylindrical body portion 58 to the outer end of which is welded a seal 59 for connection to the end of the air duct to be coupled in the same manner as the previous form. The inner end of the body portion 58 is integrally formed with the frusto-spherical, folded back sealing surface 60 (hard chrome plated and polished) for sealing engagement with the Teflon seal 56.

An annular support indicated generally at 61 is provided and includes an inner end 62 formed with a spherical supporting surface 63 adapted to support the spherical end 60 and a thickened central portion 64 which terminates in an externally threaded collar 65 adapted to be screwed into the internally threaded collar 45 of the housing assembly.

The flange 65 is provided with an internal bore 66 within which are positioned a plurality of angularly spaced tab locks indicated generally at 67. Each of the tab locks 67 includes a clamp having an upper vertical portion 68 abutting the ends of the flanges 45, 65, an inwardly extending horizontal portion which abuts the inner surface of the flange 65, a vertical portion 70 which abuts the inner end of the bore 66 and an outwardly extending horizontal portion 71. Each of the vertical portions 70 is provided with an opening through which passes the bolt 72 screw threaded into the end of the cylindrical portion 64 of the annular support. A centering spring 73 is secured to the undersurface of the horizontal portion 71 by means of a rivet or the like 74, the other end of the spring 73 bearing on the body portion 58 of the duct assembly.

A Teflon coating (0.005 inch thick) is applied to the spherical surface 63 of the support 61 and to the inner surface of the spherical end 60 of the duct assembly.

In operation and purpose the coupling shown in Figs. 4 and 5 is otherwise the same as that shown in Figs. 1 through 3.

While various changes may be made in the detailed construction, it shall be understood that such changes are in the spirit and scope of the present invention as defined by the appended claims.

I claim:

1. An angular coupling for air ducts or the like comprising a duct, means at one end for fixedly securing said duct to an air duct or the like, a folded back, hollow, substantially frusto-spherical enlargement at the other end of said duct, housing assembly means inclosing said frusto-spherical enlargement, means at one end of said housing assembly means for fixedly connecting the same to an air duct or the like, the other end of said housing assembly means extending beyond said frusto-spherical enlargement, seal assembly means intermediate said frusto-spherical enlargement and said housing assembly means and including substantially frusto-conical seal in contact with said frusto-spherical enlargement, annular retainer means, means for connecting said annular retainer means to the extended end of said housing assembly means, and ball bearing means located between said annular retainer means and said frusto-spherical enlargement, said housing assembly means including a hollow cylindrical portion enclosing said seal assembly means and an inwardly extending shoulder, said seal assembly means comprising annular wave washer means abutting said shoulder, an annular retainer surrounding said frusto-spherical enlargement in abutment with said annular wave washer means, seal means intermediate said annular retainer and said cylindrical portion of said housing assembly means, said frusto-conical seal being mounted intermediate said annular retainer and said frusto-spherical enlargement.

2. An angular coupling according to claim 1, said seal means comprising said annular retainer having an annular groove, and an O-ring within said groove for sealing engagement with said cylindrical portion of said housing assembly means.

3. An angular coupling for air ducts and the like according to claim 1, said housing assembly means including a substantially frusto-conical portion extending beyond said spherical enlargement and terminating in a substantially cylindrical portion having inwardly extending internally threaded flange, said annular retainer means being screwed into said internally threaded flange, and tap lock means securing the ends of said internally threaded flange and annular retainer means together.

References Cited in the file of this patent

UNITED STATES PATENTS

| | | |
|---|---|---|
| 1,349,060 | Gall | Aug. 10, 1920 |
| 1,617,589 | Gold | Feb. 15, 1927 |
| 1,884,944 | Williams | Oct. 25, 1932 |
| 2,494,598 | Waring | Jan. 17, 1950 |
| 2,531,020 | Bard | Nov. 21, 1950 |
| 2,712,456 | McCreery | July 5, 1955 |

FOREIGN PATENTS

| | | |
|---|---|---|
| 649,090 | Great Britain | Jan. 17, 1951 |